United States Patent Office 3,182,239
Patented May 4, 1965

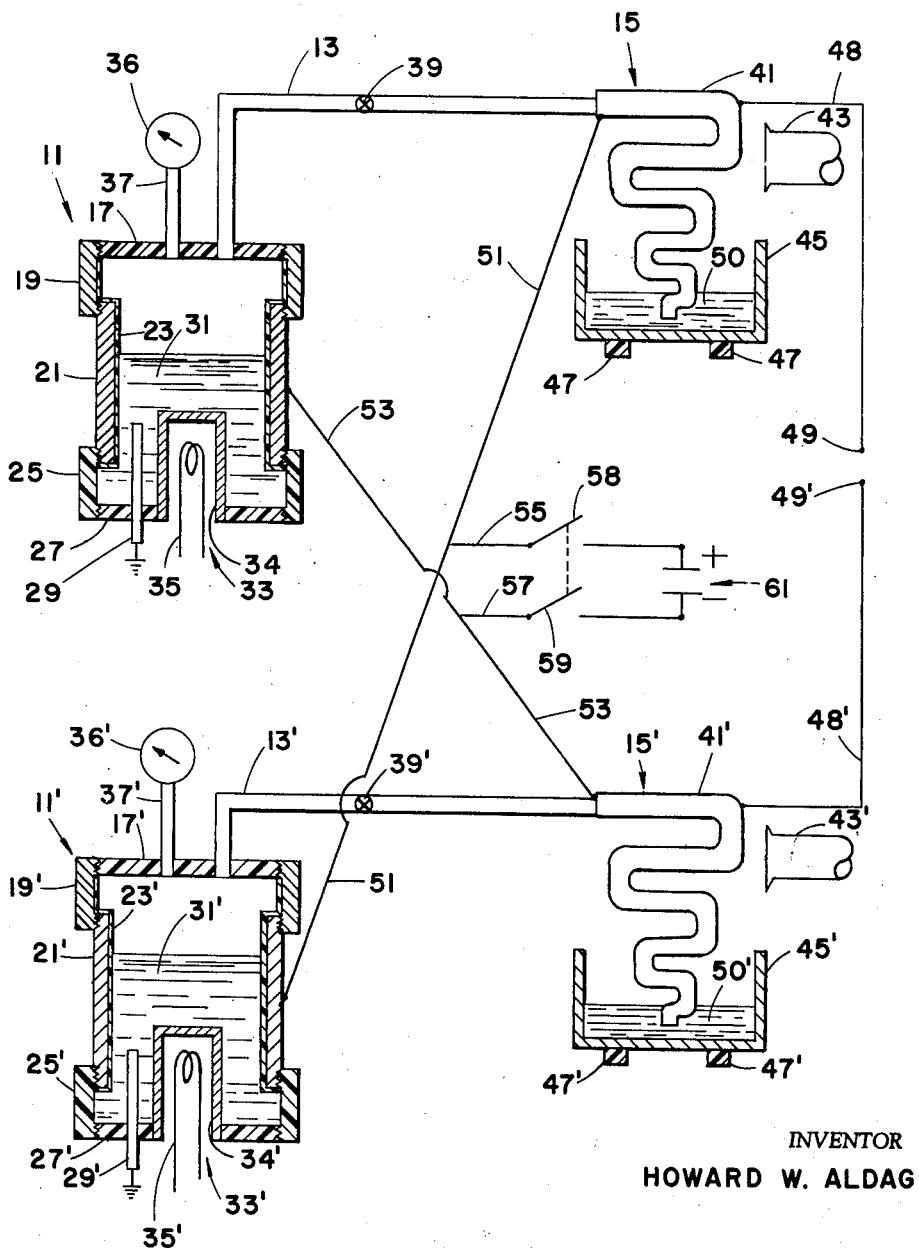

3,182,239
ELECTROSTATIC CHARGING
Howard W. Aldag, Utica, N.Y., assignor to The Bendix Corporation, Utica, N.Y., a corporation of Delaware
Filed May 25, 1961, Ser. No. 112,723
7 Claims. (Cl. 317—262)

This invention relates to the generation of electrostatic charges and more particularly concerns a method for producing high potential electrostatic charges.

An object of the present invention is to provide an improved method for producing an electrostatic charge which does not require means having movable parts.

A further object is the provision of a method for generating a high electrostatic potential by using heat energy and by using opposite charges as formed to give bootstrap operation.

Another object is to provide a non-mechanical, heat-energized method for making an electrostatic charge in which a charge is repeatedly built up and successively discharged through a medium or load providing a predetermined resistance to leave a residual potential.

An additional object is to provide a method for generating electrostatic potential in which heat energy provides separate flows of oppositely-charged vapors which are condensed to give positive and negative charges for a build-up of an electrostatic potential.

The realization of the above objects along with the features and advantages of the invention will be apparent from the following description and the accompanying drawing.

The drawing is a schematic showing and shows two oppositely-charging systems with each system including a boiler for providing charged vapors and a condenser for liquefying to give a charged condensate. Each condenser coil is electrically connected to the charging ring of the opposite boiler so that collected charge is impressed on the liquid being heated to give the liquid a charge opposite to the collected charge for bootstrap operation.

Referring to the drawing, the upper system which generates a positive charge will be described in detail, while the lower negatively-charging system will not be described in detail since it is identical to the upper system. The lower system has primed reference numerals for elements which correspond to the numbered elements of the upper system. The upper system includes a boiler 11 connected by nylon transfer pipe 13 to condenser 15. Boiler 11 has nylon plug 17 threaded into an iron coupling 19 which also receives at its other bottom end a threaded iron pipe 21. Pipe or charging ring 21 and coupling 19 have an interior coating 23 of an electrically-insulating material such as Bakelite varnish. The lower end of pipe 21 is threaded into a nylon coupling 25 which has a bottom nylon plug 27 threaded into its lower end. Bottom plug 27 has a ground rod 29 projecting into the body of water 31 which is contained in boiler 11. Bottom plug 27 also has a heating source 33 projecting into liquid 31 which has a level between the top and the midpoint of pipe 21. Heat source 33 includes a cylindrical housing 34 and an electric heating element 35. Ground rod 29 permits water 31 to easily acquire a positive charge when insulated pipe 21 is given a negative charge.

At the top of boiler 11, a pressure gage 36 is mounted on pipe 37 which extends through plug 17. Transfer pipe 13 also extends through plug 17 so that any pressurized vapors in the top of boiler 11 can move through pipe 13 which is made of nylon or other non-conductive, non-wetting material. Transfer pipe 13 has a control valve 39 which serves to provide a suitable pressure in boiler 11 so that vapors are moved by the energy thereof through transfer pipe 13 to the condenser 15. Transfer pipe 13 is connected to the copper coil 41 of condenser 15. Coil 41 is cooled by air supplied by conduit 43 so that vapors are condensed. Coil 41 is suspended in steel collecting tank 45. Tank 45 is electrically insulated by means of nylon legs 47 and contains water or condensate 50 which contacts the bottom of coil 41. A discharge wire 48 connects to coil 41 and has an output terminal 49 which is thus subject to any positive charge of condensate 50.

The foregoing details of construction are duplicated in the lower negatively-charging system and, as mentioned, have primed corresponding reference numerals. Thus, boiler 11' has pipe 13' while condenser 15' has coil 41' connected to transfer pipe 13' so that water 31' can be vaporized and the vapors can be moved and liquefied for tank 45'. Output terminal 49' is spaced from the other output terminal 49 to represent an air or gas arc gap or other load providing a predetermined resistance. The arc load can be a plasma engine or a welding machine. Terminal 49' is connected to condensate 50' by discharge wire 48' and condensing coil 41' so that terminal 49' will be subject to any negative charge of condensate 50'.

The top of coil 41 of the upper system is connected by wire 51 to pipe 21' of boiler 11' of the lower system while the top of the coil 41' of the lower system is connected by wire 53 to pipe 21 of boiler 11 of the upper system. With this arrangement, it is apparent that a positive electrostatic charge at condensate 50 and coil 41 will be impressed on pipe 21' and water 31' will take on an opposite or negative charge while a negatively-charged condensate 50' of the lower system will induce a positive charge in water 31 of the upper system.

In order to give water 31 of the upper system a small, start-up positive charge and water 31' in the lower system a small negative charge, two charge wires 55 and 57 are respectively connected to wire 51 extending to pipe 21' and to wire 53 extending to pipe 21. Charge wires 55 and 57 respectively have switches 58 and 59 which are operated at the same time and are normally open. A charged capacitor 61 is connected to the charge wires 55 and 57. Thus, when start-up charging is desired, switches 58 and 59 are closed and then opened after the transfer of the charge of capacitor 61 so that small opposite charges are induced in the bodies of water.

In operation, two bodies of water 31 and 31' are provided and are grounded by rods 29 and 29'. Capacitor 61 which has been previously charged is connected to charge wires 55 and 57 and then to cross wires 51 and 53 and by closing switches 58 and 59. This causes small opposite electrostatic charges to exist on the two bodies of water in boilers 15 and 15'. For example, water 31 (with a negative charge on pipe 21 which is insulated from the water by coating 23) becomes positively charged with the negative charge moving to ground through ground rod 29. Water 31' is simultaneously negatively charged. The capacitor 61 is then disconnected by opening both switches 58 and 59. Heat is then applied or increased by sources 33 and 33' so that steam or vapor generating conditions exist.

As steam is generated from water 31 which is positively-charged, some of this charge is carried in the steam. In other words, some gaseous water molecules are positively charged. Other molecules are neutral. Thus, the evolving steam carries a coulomb charge which is transported by the flow of steam from boiler 31 to condenser 15 where condensate 50 having a positive charge forms.

As above described, there is a parallel but negatively-charging system including boiler 31' and condenser 15' which produces an opposite or negative charge in condensate 51' which is connected via condensing coil 41' to output terminal 49'.

Since the lower negatively-charging system is connected by wire 53 to pipe 21 of the positively charging system, the negative charge on pipe 21 depends on the charge at condenser 15'. Therefore, as this negative charge builds up to coulomb charge from the condensed steam, the effective charge at pipe 21 of boiler 11 is increased, with subsequent increase in positive charge in the water 31 and hence in the steam leaving boiler 11. A similar progressive bootstrap effect results in the negatively charging system at boiler 11' as influenced by condensate 50. With continued heating and movement of steam, both positive and negative charges respectively at condensers 15 and 15' continue to increase as condensates are formed until a high potential exists at terminals 49 and 49'. This potential causes arcing at the terminals 49 and 49' or is otherwise discharged. Since a residual potential exists after arcing due to the air gap or other load discharge giving a predetermined resistance, the two systems will repeat the build-up and give a periodic arcing or discharge.

From the foregoing, it is apparent that a non-mechanical, heat-energized method of generating a high electrostatic potential has been provided. A first body of water 31 having small positive charge and a second body of water 31' having a small negative charge are established. The charged capacitor 61 gives the small start-up charges to these bodies of water. The bodies are then heated to give a positively-charged flow of steam and a negatively-charged flow of steam. The charged flow are pressurized and are moved to condensing zones by using the energy of the steam or vapors. Oppositely-charged condensates 50 and 50' are formed and the first and second bodies of water are subjected to the respective charges of the condensates. By continuing the heating and impressing the charges as condensates are formed, a bootstrap operation is provided so that a high potential develops between the condensates. After discharge through the terminals 49 and 49', the build-up will be repeated so that a high potential periodically exists and successive discharges occur.

It is to be understood that changes can be made in the disclosed embodiment of the invention by persons skilled in the art without departing from the invention as set forth in the appended claims.

What is claimed is:

1. The method of generating an electrostatic potential comprised of establishing a first body of water having a small positive charge, establishing a second body of water having a small negative charge, heating said first and second bodies of water to provide respectively a positively-charged flow of steam and a negatively-charged flow of steam, separately condensing said flows to provide a positively-charged condensate and a negatively-charged condensate, impressing the charge of the positively-charged condensate as formed on said second body of water, impressing the charge of the negatively-charged condensate as formed on said first body of water, continuing to form said condensates so that a high potential exists between said condensates.

2. The method of generating an electrostatic charge comprised of establishing a positively-charged body of water, establishing a negatively-charged body of water, heating said positively-charged water to form vapors having a positive charge, heating said negatively-charged water to form vapors having a negative charge, moving said positively-charged vapors to a first condensing zone, condensing said positively-charged vapors to form a positively-charged condensate, subjecting said negatively-charged body of water to the positive charge of said positively-charged condensate, moving said negatively-charged vapors to a second condensing zone, condensing said negatively-charged vapors to form a negatively-charged condensate, subjecting said positively-charged body of water to the negative charge of said negatively-charged condensate, continuing said steps of heating, moving, condensing and subjecting until a predetermined potential exists between said condensates.

3. The method of generating an electrostatic charge comprised of establishing a positively-charged body of water, establishing a negatively-charged body of water, heating said positively-charged water to form pressurized vapors having a positive charge, heating said negatively-charged water to form pressurized vapors having a negative charge, moving said pressurized positively-charged vapors to a first condensing zone by using the energy thereof, condensing said positively-charged vapors to form a positively-charged condensate, subjecting said negatively-charged body of water to the positive charge of said positively-charged condensate, moving said pressurized negatively-charged vapors to a second condensing zone by using the energy thereof, condensing said negatively-charged vapors to form a negatively-charged condensate, subjecting said positively-charged body of water to the negative charge of said negatively-charged condensate, continuing said steps of heating, moving, condensing and subjecting until a predetermined potential exists between said condensates.

4. The method of generating an electrostatic charge comprised of establishing a positively-charged body of water, establishing a negatively-charged body of water, heating said positively-charged water to form pressurized vapors having a positive charge, heating said negatively-charged water to form pressurized vapors having a negative charge, moving said pressurized positively-charged vapors to a first condensing zone by using the energy thereof, condensing said positively-charged vapors to form a positively-charged condensate, subjecting said negatively-charged body of water to the positive charge of said positively-charged condensate, moving said pressurized negatively-charged vapors to a second condensing zone, condensing said negatively-charged vapors to form a negatively-charged condensate, subjecting said positively-charged body of water to the negative charge of said negatively-charged condensate, providing a discharge path between said condensates, continuing said steps of heating, moving, condensing and subjecting until a predetermined potential exists between said condensates, discharging said predetermined potential so that a residual potential exists whereby another predetermined potential can be built up.

5. The method of generating an electrostatic potential comprised of inducing a positive electrostatic charge in a first body of water, inducing a negative electrostatic charge in a second body of water, heating said bodies of water to form respectively positively-charged vapors and negatively-charged vapors, moving said positively-charged vapors and said negatively-charged vapors respectively to first and second condensing zones, condensing said vapors by removing heat to form a positively-charged third body of water and a negatively-charged fourth body of water, using the positive charge of said third body of water to impress a negative electrostatic charge in said second body of water, using the negative charge of said fourth body of water to impress a positive electrostatic charge in said first body of water, continuing to form said third and fourth bodies of water from said vapors as formed until a high potential difference exists, discharging the high potential between said third and fourth bodies so that a residual potential exists.

6. The method of generating successive electrostatic discharges comprised of inducing a positive electrostatic charge in a first body of water, inducing a negative electrostatic charge in a second body of water, heating said bodies of water to form respectively pressurized positively-charged vapors and pressurized negatively-charged vapors, moving said positively-charged vapors and said negatively-charged vapors respectively to first and second condensing zones by using the energy of said vapors, condensing said vapors by removing heat to form a positively-charged third body of water and a negatively-charged fourth body of water, using the positive charge of said third body of water to impress a negative electrostatic charge in said second body of water, using the negative charge of said fourth body of water to impress a positive electrostatic charge in said first body of water, continuing to form said third and fourth bodies of water from said vapors as formed until a high potential difference exists, discharging the high potential between said third and fourth bodies so that a residual potential exists, continuing to generate successively said high potentials and to effect said discharging so that successive electrostatic discharges result.

7. The method of generating successive electrostatic discharges between first and second terminals having a load therebetween providing a predetermined resistance comprised of establishing a first body of water, establishing a second body of water, inducing a small positive charge on said first body of water, inducing a small negative charge on said second body of water, heating said first and second bodies of water to provide respectively a positively-charged flow of steam and a negatively-charged flow of steam, separately condensing said flows to provide a positively-charged condensate and a negatively-charged condensate, impressing the charge of the positively-charged condensate as formed on said second body of water and said first load terminal, impressing the charge of the negatively-charge condensate as formed on said first body of water and said second load terminal, continuing to form said condensates so that a high potential periodically exists and successive discharges through said load result.

References Cited by the Examiner
UNITED STATES PATENTS

| | | | |
|---|---|---|---|
| 1,847,671 | 3/32 | Ruben | 310—5 X |
| 2,638,555 | 5/53 | Marks | 310—5 X |
| 2,643,349 | 6/53 | Smith | 310—5 |
| 2,881,335 | 4/59 | Vonegut | 310—5 |

SAMUEL BERNSTEIN, *Primary Examiner.*

LLOYD McCOLLUM, *Examiner.*